US012760424B2

(12) United States Patent
Thayer et al.

(10) Patent No.: US 12,760,424 B2

(45) Date of Patent: Oct. 13, 2026

(54) LASER CLEAN AFTER DIFFUSION HEAT TREAT AND PRIOR TO SHOT PEEN

(71) Applicant: RTX Corporation, Farmington, CT (US)

(72) Inventors: Henry H. Thayer, Wethersfield, CT (US); Xuan Liu, Glastonbury, CT (US); Bartolomeo Palmieri, Guilford, CT (US); Kevin W. Schlichting, South Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 22 days.

(21) Appl. No.: 18/767,004

(22) Filed: Jul. 9, 2024

(65) Prior Publication Data

US 2026/0015736 A1 Jan. 15, 2026

(51) Int. Cl.

*C23C 28/04* (2006.01)
*B23K 26/352* (2014.01)
*B24C 1/10* (2006.01)

(52) U.S. Cl.

CPC .......... *C23C 28/042* (2013.01); *B23K 26/352* (2015.10); *B24C 1/10* (2013.01)

(58) Field of Classification Search

None

See application file for complete search history.

(56) References Cited

U.S. PATENT DOCUMENTS

| | | | | | |
|---|---|---|---|---|---|
| 6,042,898 | A * | 3/2000 | Burns | C23C 28/00 427/454 |
| 6,759,627 | B2 | 7/2004 | Kilburn | |
| 6,794,602 | B2 | 9/2004 | Nair et al. | |
| 8,628,624 | B2 | 1/2014 | Turner et al. | |
| 9,683,281 | B2 | 6/2017 | Meehan et al. | |
| 2010/0104773 | A1* | 4/2010 | Neal | C23C 28/3215 427/595 |
| 2013/0230723 | A1* | 9/2013 | Bamberg | C23C 24/04 427/446 |
| 2020/0318227 | A1 | 10/2020 | Thayer et al. | |
| 2022/0298645 | A1* | 9/2022 | Thayer | C23C 16/0272 |

FOREIGN PATENT DOCUMENTS

| | | | | |
|---|---|---|---|---|
| CN | 117798142 A | | 4/2024 | |
| EP | 1217089 B1 | | 3/2005 | |
| EP | 1212472 B1 | * | 12/2005 | C21D 10/005 |
| EP | 3078760 A1 | | 10/2016 | |
| EP | 4056310 A1 | * | 9/2022 | B08B 7/0042 |
| WO | WO-2015189600 A2 | * | 12/2015 | B23K 26/342 |

OTHER PUBLICATIONS

European Search Report dated Nov. 12, 2025, issued in corresponding application EP 25187941.7.

* cited by examiner

*Primary Examiner* — Mandy C Louie

(74) *Attorney, Agent, or Firm* — Bachman & LaPointe, P.C.

(57) ABSTRACT

A method for coating a component of a gas turbine engine includes providing the component having a bond coat and contaminants on a surface of the bond coat; laser treating the surface to remove the contaminants and to produce a cleaned surface on the bond coat; peening the cleaned surface to produce a peened surface on the bond coat, and applying a ceramic coat to the peened surface.

14 Claims, 3 Drawing Sheets

LASER CLEAN AFTER DIFFUSION HEAT TREAT AND PRIOR TO SHOT PEEN

FIELD

The present disclosure relates to coating of gas turbine engine components such as airfoils and the like.

BACKGROUND

High Pressure Turbine (HPT) Airfoils and other hot section parts are coated to protect them from the extreme heat of the HPT environment. The coating consists of a metallic coat that protects them from corrosion and oxidation, and a ceramic coat that serves as a thermal barrier. Beside protecting the substrate from oxidation and corrosion, the metallic coat serves as a bond coat for the ceramic.

The bond coat can be applied with, for example, Cathodic Arc deposition (Cat Arc), Low Pressure Plasma Spray (LPPS), or other methods. After metallic coat application, the parts are run through a diffusion heat treat (DHT) process to ensure a good bond between the coating and the substrate. After diffusion, parts are shot peened to densify the coating, provide compressive stress, and create a smooth surface needed by some of the ceramic coatings. During the time between coating and shot peen, contaminates can be deposited on the surface of the coating. These contaminates can be oxides that form when hot parts are removed from the coater or even the vacuum furnace. They can also include smut from the furnace; even the cleanest vacuum furnace can have some stray contaminates and even oxygen in it. There is also the possibility of random dirt found in the air in the factory finding its way onto the surface of the coating. When the parts go into the shot peen process, any contaminates on the surface can be hammered into the coating and embedded. If there is a sufficient level of contamination in the coating, it can adversely affect coating performance and part life.

SUMMARY OF THE DISCLOSURE

In one non-limiting embodiment, a method for coating a component of a gas turbine engine, comprises the steps of providing the component having a bond coat and contaminants on a surface of the bond coat; laser treating the surface to remove the contaminants and to produce a cleaned surface on the bond coat; peening the cleaned surface to produce a peened surface on the bond coat, and applying a ceramic coat to the peened surface.

In one non-limiting configuration, the laser treating step and the shot peening step are carried out in a clean environment.

In another non-limiting configuration, the peening step is carried out within 24 hours or less of the laser treating step.

In still another non-limiting configuration, the laser rasters across the surface of the part using pulses of not more than 100 ns duration and between 10% and 90% spot overlap.

In a further non-limiting configuration, the laser treatment step is carried out at a power setting of 1000 W or less.

In a still further non-limiting configuration, the providing step comprises providing a component having a metallic bond coat.

In another non-limiting configuration, the metallic bond coat comprises a MCrAlY coating.

In still another non-limiting configuration, the bond coat is applied by cathodic arc deposition, low pressure plasma spray, high velocity oxygen fuel (HVOF) or cold spray.

In a further non-limiting configuration, the ceramic coat is a yttrium stabilized zirconia (YSZ).

In a still further non-limiting configuration, the component comprises a hot section component of a gas turbine engine.

In another non-limiting configuration, the hot section component comprises a high-pressure turbine airfoil.

In still another non-limiting configuration, the method further comprises, after the laser treatment step, conducting a visual inspection of the surface to ensure contaminants have been removed.

In a further non-limiting configuration, the bond coat has a thickness of between 20 microns and 130 microns.

In a still further non-limiting configuration, the ceramic coat has a thickness of between 150 microns and 500 microns.

The foregoing features and elements may be combined in various combinations without exclusivity, unless expressly indicated otherwise. These features and elements, as well as the operation thereof, will become more apparent in light of the following description and the accompanying drawings. It should be appreciated that the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of embodiments herein makes reference to the accompanying drawings, which show embodiments by way of illustration. While these embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option. Further, any steps in a method discussed herein may be performed in any suitable order or combination. Additionally, any reference to without contact (or similar phrases) may also include reduced contact or minimal contact. It should also be understood that unless specifically stated otherwise, references to "a", "an", or "the" may include one or more than one and that reference to an item in the singular may also include the item in the plural. Further, all ranges may include upper and lower values and all ranges and ratio limits disclosed herein may be combined.

Components of industrial machines such as turbomachinery can encounter extreme temperatures and other conditions that can damage the component. Examples of such components include but are not limited to hot section parts of a gas turbine engine, such as high-pressure turbine (HPT) airfoils and other hot section parts.

Typically, these components are protected by first coating them with a bond coat, which is then diffusion heat treated, followed by shot peening to densify the bond coat, and then a ceramic coating is applied to the bond coat.

Figure 1A:
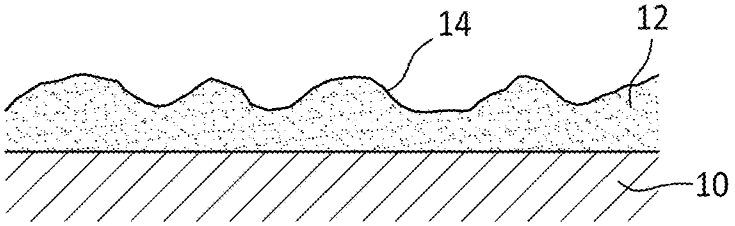
FIGS. 1*a*-1*e* illustrate a prior art process.
Figure 1B:
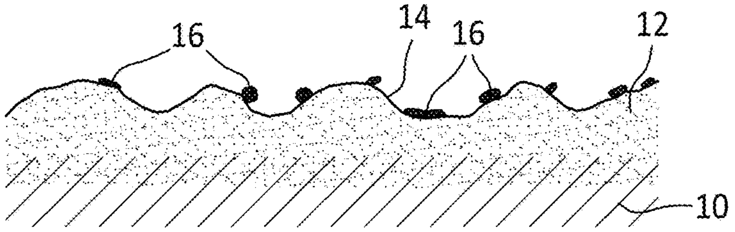

FIG. 1*a* illustrates a portion of a component 10 to which has been applied a bond coat 12. Bond coat 12 at this stage has a non-smooth surface or uneven surface 14. This surface needs to be flattened before application of the desired ceramic coating, and the flattening can be accomplished by peening, or shot peening. However, before this peening is conducted, contaminants 16 from numerous sources can form on surface 14, and this is represented in FIG. 1*b*. These contaminants 16 can be oxides that form when hot parts are removed from the coater or even the vacuum furnace. They can also include smut from the furnace, as even the cleanest vacuum furnace can have some stray contaminants and even oxygen in it. There is also the possibility of random dirt found in the air in the factory finding a path onto the surface of the coating. If there is a sufficient level of contamination in the coating, it can adversely affect coating performance and part life.

Figure 1C:
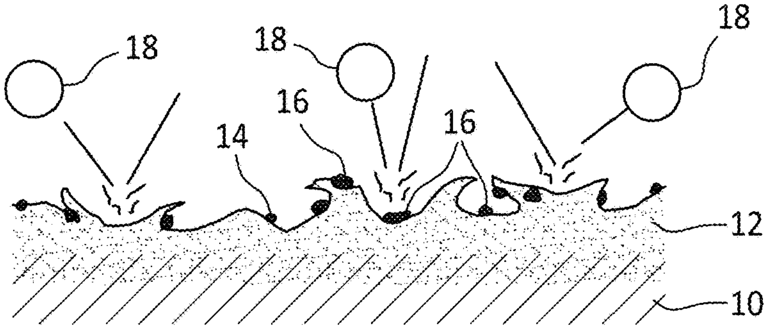
Figure 1D:
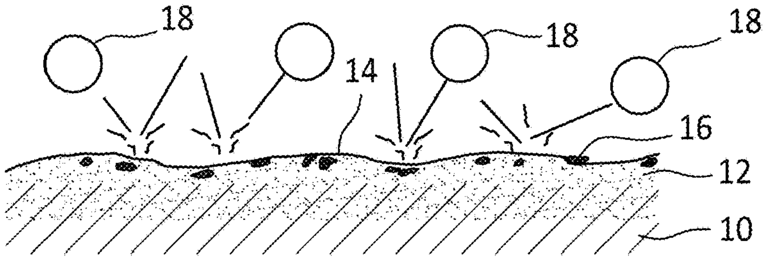
Figure 1E:
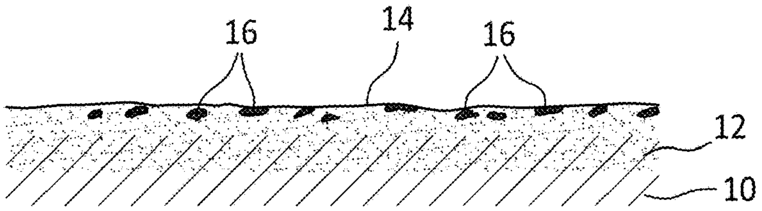

FIG. 1*c* shows the typical next step in the process, wherein the surface 14 is shot peened, schematically illustrated by a shot 18 shown bouncing off of surface 14. When the parts with these contaminants 16 go into the shot peen process, any contaminants on the surface can be hammered into the coating and embedded there. This is shown in FIG. 1*d* wherein shot peening is nearly complete, surface 14 is almost flat. However, the shot peening has embedded contaminants 16 further into the surface 14 and bond coat 12. FIG. 1*e* shows a flat surface 14 of bond coat upon substrate 10 that is ostensibly ready for coating with ceramic. However, it has been found that the embedded contaminants 16 can possibly seriously affect the quality and durability of the ceramic coating to be applied, as well as the bond coat already applied.

Figure 2:
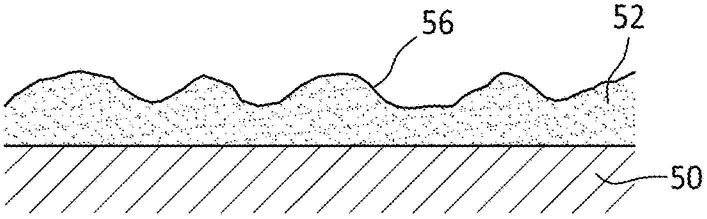
FIGS. 2-9 illustrate a non-limiting example of an embodiment as disclosed herein.
Figure 3:
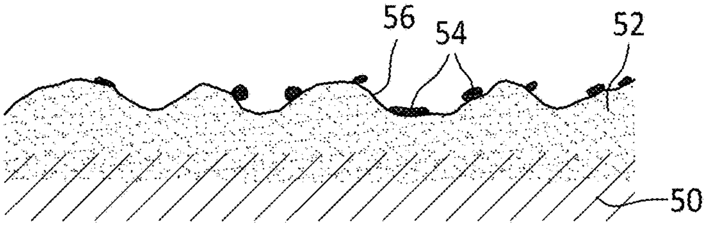
Figure 4:
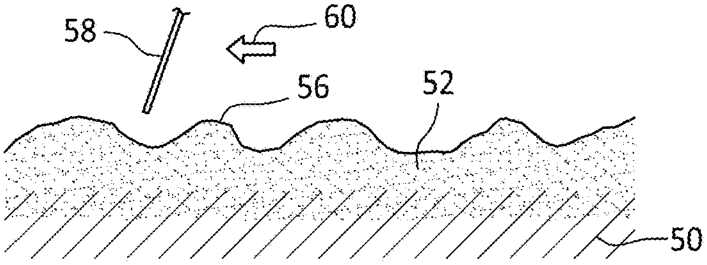

Referring now to FIG. 2, a method is illustrated wherein problems caused by contaminants 16 (FIGS. 1*a*-1*e*) are mitigated or prevented altogether. FIG. 2 shows a substrate 50 having a bond coat 52 applied thereto. Bond coat 52 can be a metallic bond coat of any suitable material, one non-limiting example of which can be a MCrAlY coating, wherein M is a base metal such as cobalt, nickel, or iron, combined with chromium, aluminum, and yttrium (CrAlY), one further non-limiting example of which is NicoCrAlY. This coating can be applied by various processes such as, but not limited to, cathodic arc deposition, low pressure plasma spray, high velocity oxygen fuel (HVOF) or cold spray, and the like. The resulting bond coat 52 has an uneven or non-smooth surface as shown in FIG. 2. Before the next steps are taken, components with bond coat 52 are run through a diffusion heat treatment process which can help to ensure a good bond between the bond coat and the surface of substrate 50. As set forth above, and referring to FIG. 3, this can result in various contaminants 54 being formed on a surface 56 of bond coat 52. Referring to FIG. 4, the components in this condition, with contaminants 54 formed on surface 56, are cleaned using a laser treatment process as illustrated in FIG. 4. In FIG. 4, the laser treatment is schematically illustrated at 58, and this treatment can traverse surface 56 as illustrated schematically by arrow 60.

Laser treatment in this step can be conducted for a short period of time and/or at low power because at this stage in the process, contaminants 54 have not been forced into the bond coat material as they might be in an as-cast part or a part that has been machined. Therefore, contaminants 54 can more readily be removed, for example using a laser at a power setting of 1000 W or less.

In one non-limiting configuration, the laser can be controlled to raster across the surface of the bond coat on the part using pulses of not more than 100 ns duration and between 10% and 90% spot overlap.

Figure 5:
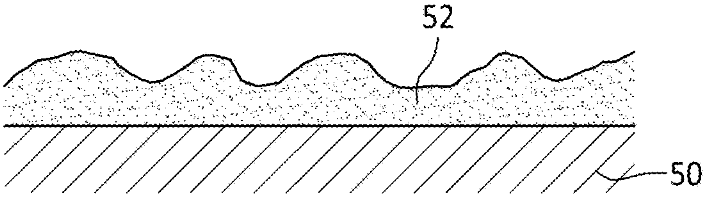

The end result is a laser treated or cleaned surface 56 as shown in FIG. 5, which is now the starting point for the shot peening as discussed above. Because the contaminants 54 have been removed, shot peening can be conducted as shown in FIGS. 6 and 7 to reach a flat surface 56 as shown in FIG. 7, without the impact or other adverse effect of contaminants being hammered into surface 56 by shot peening.

It should be appreciated that the laser treatment and shot peening steps should be carried out in a clean environment in order to limit or prevent the formation of contaminants on the cleaned surface before shot peening is commenced. Further, it can be helpful to have the two processes follow each other relatively quickly, the one after the other, so that there is little or no chance for new contaminants to form before the shot peening process begins. Thus, in one non-limiting configuration, it is desirable to conduct both the laser treatment and shot peening in a clean environment, and further it can also be desirable to commence the shot peening within about 24 hours or less after the laser treatment is completed.

After the laser treatment or cleaning step is conducted, an inspection of the surface may be appropriate to confirm that it is free of contaminants. This inspection can be manual or automated. With contaminants of the type involved, a manual inspection to ensure contaminants have been removed can be sufficient. Alternatively, automated inspection can be conducted using known methods and hardware, and/or the laser treatment can be conducted for a pre-selected period of time that is expected to be sufficient.

Figure 6:
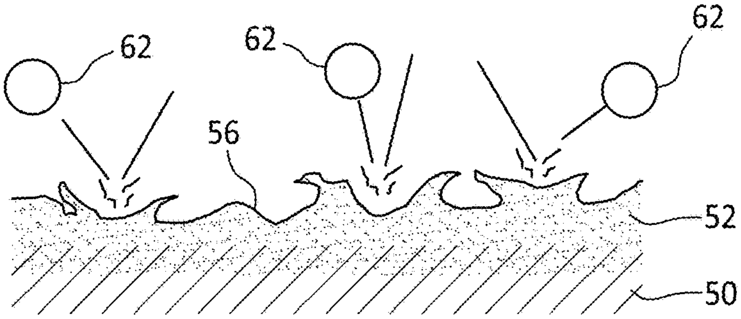
Figure 7:
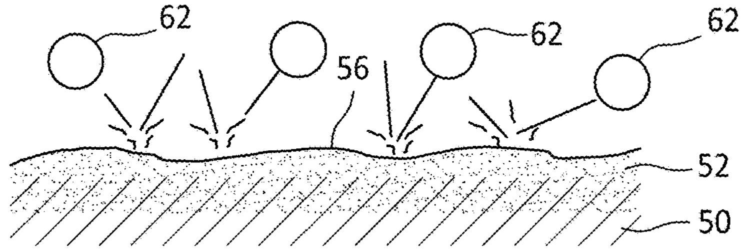
Figure 8:
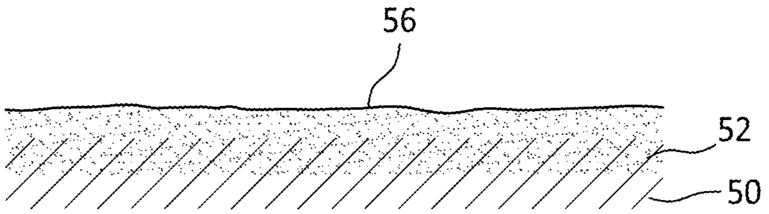
Figure 9:
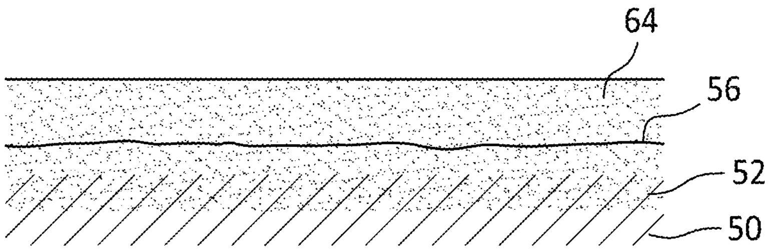

Peening or shot peening can be carried out using known techniques, and is represented in FIGS. 6 and 7 by a shot 62 impacting surface 56 until it is gradually flattened to the configuration shown in FIG. 7 and eventually FIG. 8. At this stage, and again with some sense of not allowing excessive time to pass, ceramic coat 64 (FIG. 9) can be applied to component 50, specifically to the shot peened and cleaned surface of the bond coat 52.

Ceramic coat or coating 64 can be any suitable ceramic material which is capable of withstanding the expected conditions. In one non-limiting embodiment, this material can be a rare earth oxide stabilized material selected from the group consisting of zirconia, hafnia, and titania, and one further non-limiting example is yttrium stabilized zirconia (YSZ), which is suitable and available in several commercially available versions.

The laser cleaning step can be performed with any standard laser cleaning equipment, typically featuring a near IR laser (i.e. 1064 nm wavelength) and a mechanism such as a robot for manipulating the part or the laser to ensure complete cleaning can also be employed. This moment or movement is illustrated schematically in FIG. 4 at arrow 60.

Figure 10:
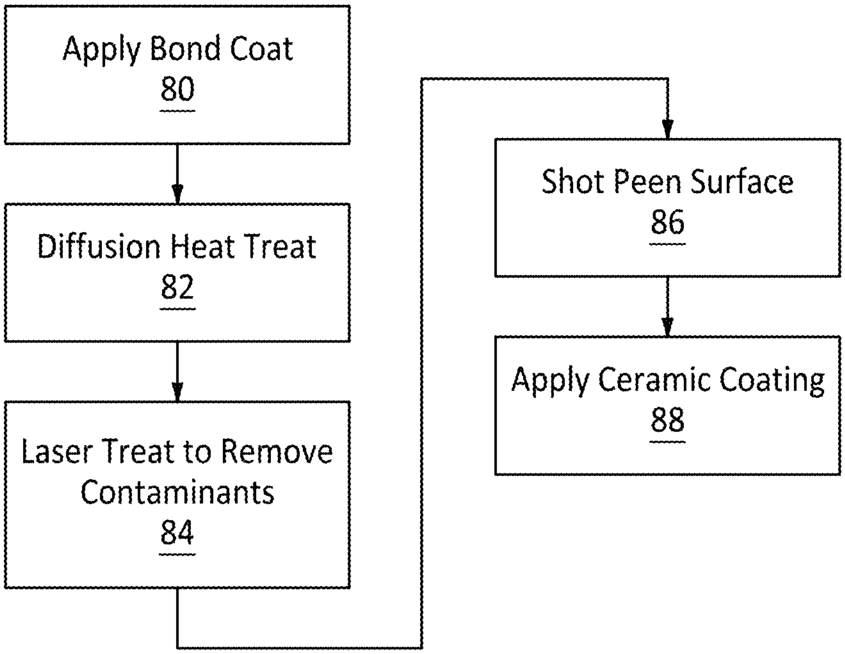
FIG. 10 is a flow diagram of a method as disclosed herein.

FIG. 10 illustrates a flow chart representing aspects of a method as disclosed herein.

As shown, the process starts with application of a bond coat to the substrate or component (step 80). In step 82, the part with bond coat is diffusion heat treated in step 82, and then cleaned of any contaminants in step 84. The resulting cleaned, but still uneven surface is then shot peened, or impacted numerous times by a shot or other solid structure, to flatten the cleaned surface (step 86). Then, finally, in step 88 a ceramic coating can be applied over the component as desired.

In one non-limiting configuration, bond coat or metallic coat can be applied having a thickness of between 20 microns and 130 microns. Also, in another non-limiting configuration, ceramic coat can be applied having a thickness of between 150 microns and 500 microns.

This disclosure has the benefit of removing contaminants from the surface of the part prior to shot peen so that the contaminants are not hammered into the coating and embedded in it. Unlike other cleaning methods like grit blast or belt sanding, it does not risk introducing new contaminates during the cleaning. This problem is particularly notable in the case of grit blast, which can embed aluminum oxide grit in the surface of the coating. Laser cleaning is also more repeatable than grit blast because the grit loses its abrasive quality over time, and can also load up with contaminants that it has removed from other parts.

The resulting coated component has a bond coat on the component, and a ceramic coat on the bond coat. The interface between the bond coat and the ceramic coat is substantially flat from the shot peening, and is also substantially free of contaminants, thereby enhancing the properties and durability of the overall coating.

The foregoing description is exemplary of the subject matter of the subject matter disclosed herein. Various non-limiting embodiments are disclosed, however, one of ordinary skill in the art would recognize that various modifications and variations in light of the above teachings will fall within the scope of the appended claims. It is therefore to be appreciated that within the scope of the appended claims, the disclosure may be practiced other than as specifically described. Thus, the scope of the present claims is not specifically limited by the details of specific embodiment disclosed herein, but rather the claims define the full and reasonable scope of the disclosure.

We claim:

1. A method for coating a component of a gas turbine engine, comprising the steps of:

providing the component having a bond coat and contaminants on a surface of the bond coat;

laser treating the surface to remove the contaminants and to produce a cleaned surface on the bond coat;

peening the cleaned surface to produce a peened surface on the bond coat, and applying a ceramic coat to the peened surface.

2. The method of claim 1, wherein the laser treating step and the peening step are carried out in a clean environment.

3. The method of claim 1, wherein the peening step is carried out within 24 hours or less of the laser treating step.

4. The method of claim 1, wherein the laser rasters across the surface of the bond coat using pulses of not more than 100 ns duration and between 10% and 90% spot overlap.

5. The method of claim 1, wherein the laser treatment step is carried out at a power setting of 1000 W or less.

6. The method of claim 1 wherein the providing step comprises providing a component having a metallic bond coat.

7. The method of claim 1, wherein the metallic bond coat comprises a MCrAlY coating.

8. The method of claim 1, wherein the bond coat is applied by cathodic arc deposition, low pressure plasma spray, high velocity oxygen fuel or cold spray.

9. The method of claim 1, wherein the ceramic coat is a yttrium stabilized zirconia (YSZ).

10. The method of claim 1, wherein the component comprises a hot section component of a gas turbine engine.

11. The method of claim 10, wherein the hot section component comprises a high-pressure turbine airfoil.

12. The method of claim 1, further comprising, after the laser treatment step, conducting a visual inspection of the surface to ensure contaminants have been removed.

13. The method of claim 1, wherein the bond coat has a thickness of between 20 microns and 130 microns.

14. The method of claim 1, wherein the ceramic coat has a thickness of between 150 microns and 500 microns.

* * * * *